(12) United States Patent
Rajyaguru et al.

(10) Patent No.: US 12,541,709 B2
(45) Date of Patent: Feb. 3, 2026

(54) FEATURE GENERATION OPTIMIZATION

(71) Applicant: International Business Machines Corporation, Armonk, NY (US)

(72) Inventors: Chintan Rajyaguru, Cary, NC (US); Donnie Allen Smith, Jr., Raleigh, NC (US); Jeffrey N. Eisen, Newton, MA (US); Willie Robert Patten, Jr., Hurdle Mills, NC (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 17/362,385

(22) Filed: Jun. 29, 2021

(65) Prior Publication Data

US 2022/0414535 A1  Dec. 29, 2022

(51) Int. Cl.
*G06N 20/00* (2019.01)
(52) U.S. Cl.
CPC .................... *G06N 20/00* (2019.01)
(58) Field of Classification Search
CPC .................................. G06N 20/00
See application file for complete search history.

(56) References Cited

U.S. PATENT DOCUMENTS

| | | | |
|---|---|---|---|
| 9,244,887 B2 | 1/2016 | Leonard | |
| 10,282,445 B1 | 5/2019 | Lu | |
| 10,380,498 B1* | 8/2019 | Chaoji | G06N 7/01 |
| 10,540,606 B2* | 1/2020 | Dirac | G06N 20/00 |
| 2013/0282628 A1 | 10/2013 | Bengfort | |
| 2014/0129507 A1 | 5/2014 | Tanaka | |
| 2018/0121254 A1 | 5/2018 | Ghare | |
| 2018/0253669 A1* | 9/2018 | Thunoli | G06Q 10/067 |
| 2018/0285780 A1 | 10/2018 | Ouyang | |
| 2019/0325352 A1* | 10/2019 | Tsai | G06F 16/282 |
| 2020/0082213 A1* | 3/2020 | Zhao | G06V 10/771 |
| 2020/0257927 A1* | 8/2020 | Nomi | G06N 20/00 |

(Continued)

FOREIGN PATENT DOCUMENTS

| | | |
|---|---|---|
| CN | 108921123 A | 11/2018 |
| CN | 108985464 A | 12/2018 |

OTHER PUBLICATIONS

Qinghua Hu, Jinfu Liu, Daren Yu, Mixed feature selection based on granulation and approximation, Knowledge-Based Systems, vol. 21, Issue 4, (https://www.sciencedirect.com/science/article/pii/S0950705107000755) (Year: 2008).*

(Continued)

*Primary Examiner* — James T Tsai
(74) *Attorney, Agent, or Firm* — Heather Schuler

(57) ABSTRACT

A system may include a memory and a processor in communication with the memory. The processor may be configured to perform operations. The operations may include receiving data, mapping a plurality of features to a plurality of attributes of the data, and generating a feature-to-attribute map based on said mapping. The operations may further include submitting new data to a feature calculation loop and implementing the feature calculation loop. The operations may also include tracking the features in the feature calculation loop, identifying a changed feature in the features, and recalculating for the changed feature using the feature calculation loop.

22 Claims, 6 Drawing Sheets

(56) References Cited

U.S. PATENT DOCUMENTS

| | | | |
|---|---|---|---|
| 2021/0043186 A1 | 2/2021 | Nagano | |
| 2021/0241146 A1* | 8/2021 | Bonaci | G06F 16/24568 |
| 2022/0188690 A1* | 6/2022 | Rawat | G06V 10/82 |
| 2023/0169395 A1* | 6/2023 | Pogde | G06N 20/00 |
| | | | 706/12 |
| 2023/0214711 A1* | 7/2023 | Paulraj | G06F 21/60 |
| | | | 706/12 |
| 2023/0237018 A1* | 7/2023 | Wang | G06F 21/6227 |
| | | | 707/737 |

OTHER PUBLICATIONS

Hugh Leather, Edwin Bonilla, and Michael O'boyle. 2014. Automatic feature generation for machine learning—based optimising compilation. ACM Trans. Archit. Code Optim. 11, 1, Article 14 (Feb. 2014), 32 pages. https://doi.org/10.1145/2536688 (Year: 2014).*

Li, Li, et al. "Feature generation based on knowledge graph." IFAC—PapersOnLine 53.5 (2020): 774-779. (Year: 2020).*

Davis, et al., "A dynamic file organization model." Published in 1984. 8 pages. In The Computer Journal vol. 27.2 (1984): pp. 143-150. https://academic.oup.com/comjnl/article/27/2/143/343320.

Heintz, et al., "Optimizing grouped aggregation in geo-distributed streaming analytics." Published Jun. 2015.12 pages. In Proceedings of the 24th International Symposium on High-Performance Parallel and Distributed Computing, pp. 133-144. https://dl.acm.org/doi/10.1145/2749246.2749276.

Mell, et al., "The NIST Definition of Cloud Computing," Recommendations of the National Institute of Standards and Technology, U.S. Department of Commerce, Special Publication 800-145, Sep. 2011, 7 pgs.

Wechsler, et al., "A model for setting optimal data-acquisition policy and its application with clinical data." Published in 2013. 16 pages. In Thirty Fourth International Conference on Information Systems, Milan.

Zak, et al., "A Continuous Markov-Chain Model of Data Quality Transition: Application in Insurance-Claim Handling." Published in 2015. 16 pages. International Conference on Design Science Research in Information Systems. Springer, Cham, pp. 199-214.

* cited by examiner

Data Attribute Feature Mapping
100

Entity Attribute Feature Mapping
200

FEATURE GENERATION OPTIMIZATION

BACKGROUND

The present disclosure relates to analytical processing, and, more specifically, to determining input parameters for a trained model.

Feature calculation in analytical processing is computationally expensive and time-consuming. The size and complexity of feature computations applies to training data as well as calculating analytical model inputs, making computations even more expensive and time-consuming.

SUMMARY

Embodiments of the present disclosure include a system, method, and computer program product for feature generation optimization. A system in accordance with the present disclosure may include a memory and a processor in communication with the memory. The processor may be configured to perform operations. The operations may include receiving data, mapping a plurality of features to a plurality of attributes of the data, and generating a feature-to-attribute map based on said mapping. The operations may further include submitting new data to a feature calculation loop and implementing the feature calculation loop. The operations may also include tracking the features in the feature calculation loop, identifying a changed feature in the features, and recalculating for the changed feature using the feature calculation loop.

In some embodiments of the present disclosure, the plurality of features is a subset of the features. In some embodiments of the present disclosure, the feature calculation loop maintains the feature-to-attribute map.

In some embodiments of the present disclosure, the feature calculation loop is an infinite feature calculation loop. Some embodiments of the present disclosure include streaming the new data to the system continuously. Some embodiments of the present disclosure include selecting the subset using predetermined criteria.

Some embodiments of the present disclosure further include calculating a difference between the changed feature and an unchanged value of the changed feature. Some embodiments further include determining the difference exceeds a significance threshold. In some embodiments, the significance threshold is quantified using a level of granularity of the features.

In some embodiments of the present disclosure, the attribute is an entity attribute. In some embodiments of the present disclosure, the attribute is a data attribute.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
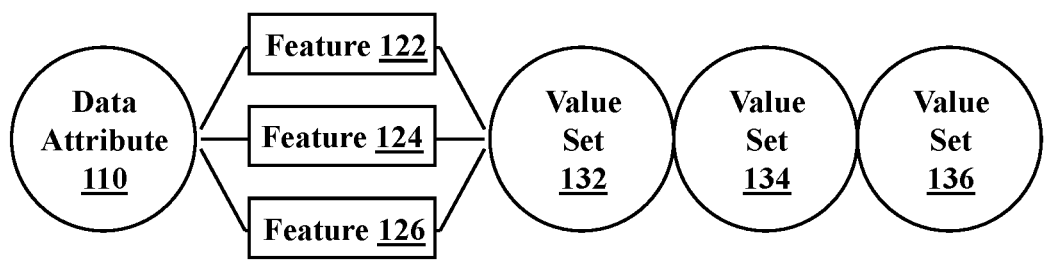
FIG. 1 illustrates data attribute feature mapping in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to analytical processing, and, more specifically, to determining input parameters for a trained model.

Feature calculation in analytical processing is computationally expensive and time-consuming. The resources required for feature calculation may be amplified by the size and complexity of individual feature computations as well as aggregated calculations. The size and complexity of feature computations applies to training data as well as calculating analytical model inputs, making computations even more expensive and time-consuming. The significant resource expenses required to compute features may prevent models from being used when time sensitivity is a concern, such as for real time applications.

For example, feature calculations in financial crimes may have to calculate features over 3+ billion transactions and 30+ million entities and/or over 15 years' worth of data. The size and complexity of feature computations not only applies to training data but also applies to calculating the inputs into the analytical models. Expensive and long running computations for model inputs prevents models from being invoked in real time. Some analytical systems run computations as batch processes that calculate all features on the data. Some analytical systems run these computations recalculate all the features whether the underlying data has changed or not. Performing the same calculations on the same data is time consuming and inefficient.

The present disclosure provides mechanisms for handling large volumes of data and calculate features without increasing hardware needs. Moreover, the present disclosure provides support for on demand analytics by calculating features quickly and running analytics on the relevant data. The present disclosure may be used to calculate the input parameters of a trained machine learning (ML) model and running the ML model with the selected parameters.

In some embodiments of the present disclosure, mechanisms for computing and recomputing only the necessary features are provided, and a never-ending feature calculation loop may be implemented. In some embodiments, data attributes may be mapped with features, the subset of features computed and/or recomputed may be limited based on various criteria, and feature calculations may be continuously run as data becomes available. Computation and recomputation may be limited to only the necessary features.

Most data in an analytical system doesn't change. Restricting the feature calculations only to the data that has changed can significantly reduce the time and computations required to complete the feature calculations. Mapping between data and associated features allows for identifying subsets of the features that need to be recalculated. In some embodiments, the map is maintained in memory. Maintaining mapping between data and features as new features and data sets are added to the system enables identifying changed data, enabling unchanged data to not need to undergo recomputation while maintaining a properly computed dataset.

In some embodiments of the present disclosure, the attribute is an entity attribute; in some embodiments of the present disclosure, the attribute is a data attribute. Mapping granularity may occur at multiple levels such as, for example, both a data attribute level and an entity level. The greater the granularity, the more detail will be available from the mapped data. Such additional detail generally comes at the expense of increased computational expense.

Features may be mapped at a data attribute level. An example of data attribute level mapping is mapping a feature to a specific bank account balance. Mapping granularly, such as at the data attribute level, most accurately identifies the features that need to be recalculated. However, it is also more complex and computationally expensive to recognize data change at the attribute level than at higher mapping levels.

In some embodiments of the present disclosure, data may be received, and a plurality of features may be mapped to a plurality of attributes of the data to generate a feature-to-attribute map. The plurality of features may be a subset of features. New data may be submitted to a feature calculation loop and the feature calculation loop may be implemented. The feature calculation loop may maintain the feature-to-attribute map. The feature calculation loop may track the features. A changed feature may be identified in the features, and the feature calculation loop may recalculate for the changed feature.

FIG. 1 illustrates data attribute feature mapping 100 in accordance with some embodiments of the present disclosure. Value sets 132, 134, and 136 have various features 122, 124, and 126. Features 122, 124, and 126 are mapped to a data attribute 110.

The relationship between attributes, features, and value sets may generally be described as a many-to-many relationship such that multiple attributes may be related to many features from varying value sets. For example, a first attribute may have a relationship with a first feature that may be in a first and a second value set. In another example, a second attribute may have a relationship with a second feature and a third feature which are both in a third value set and the second feature is also in a fourth value set.

Features may also be mapped at an entity level. An example of entity level mapping is mapping a feature to a postal address. This may result in some unnecessary recalculations of features. For example, only address line 2 may have changed, which is unlikely to result in a change in feature values, but the features will be recalculated regardless. In some embodiments, recognizing a change at the entity level might be easier than recognizing similar changes at a data attribute level.

Figure 2:
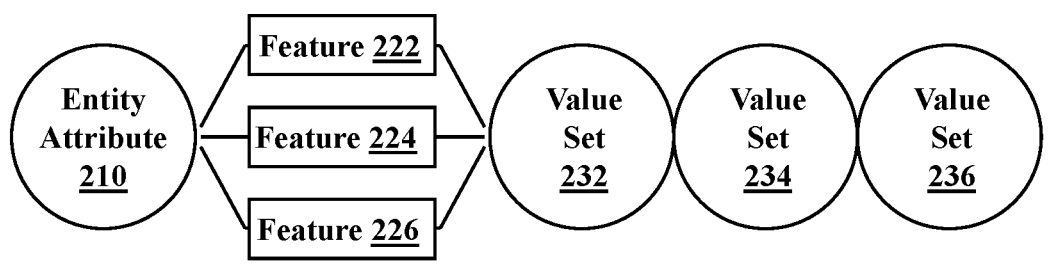
FIG. 2 depicts entity attribute feature mapping in accordance with some embodiments of the present disclosure.

FIG. 2 depicts entity attribute feature mapping 200 in accordance with some embodiments of the present disclosure. Value sets 232, 234, and 236 have various features 222, 224, and 226. Features 222, 224, and 226 are mapped to an entity attribute 210.

A change in the value of the data must be recognized to employ the present disclosure. Mechanisms and methods known in the art for recognizing data changes may be used to identify whether data has changed. Additionally, separate components may be envisioned in the system such that other techniques may be used to identify whether the data has changed. Similarly, a component could be envisioned that could contain the logic to determine when to compute or recompute certain features.

Figure 3:
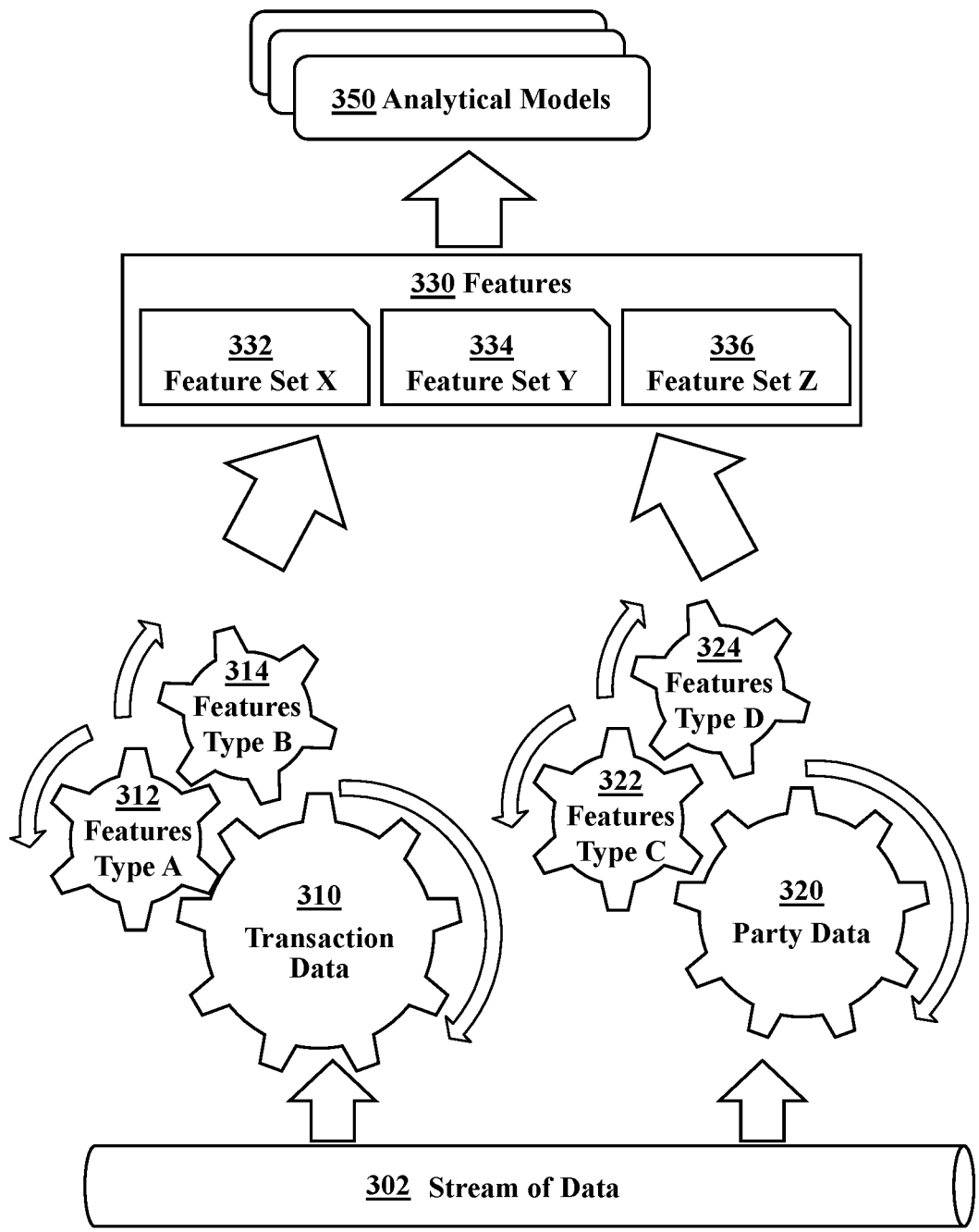
FIG. 3 illustrates a feature calculation loop in accordance with some embodiments of the present disclosure.

FIG. 3 illustrates a diagram of a feature calculation loop 300. A stream of data 302 may be streamed to listeners such as a listener for transaction data 310 and a listener for party data 320. The streaming of data may be continuous. Additional listeners may be employed as desired, such as to compensate for additional volume of data from the stream of data 302.

Streaming mechanisms known in the art may be used for processing. The receiving mechanism may have a feature engine. The receiving feature engine may deploy multiple listeners to facilitate parallel processing. Listeners maintain the upkeep of features 330 by keeping track of the relevant features and updating the feature information as necessary. Listeners may determine whether a feature needs to be recomputed. If any feature needs to be recomputed, the listener may identify the feature requiring recomputation, save the feature, and recompute it.

Listeners may be general purpose (e.g., capable of tracking any type of data). Listeners may be tasked with specific types of information (e.g., specializing in a particular domain of feature data). For example, the listener for the transaction data 310 may be tasked with information for features type A 312 and features type B 314. Features type A may include, for example, behavioral features (e.g., observable actions of a party during a particular transaction), and features type B may include, for example, aggregate features (e.g., metadata concerning comparisons between a particular transaction with one party and similar transactions with other parties). The listener for the party data 320 may be tasked with tracking different information. For example, the listener for the party data 320 may be tasked with information for features type C 322 and features type D 324. Features type C 322 may include, for example, user data features (e.g., information derivable submitted to a user profile), and features type D 324 may include, for example, association features (e.g., patterns between users with similar user profile information, or common actions of users with similar user profile information).

A listener may recompute types of features based on data from the stream of data 302 achieving certain predetermined criteria. Predetermined criteria may include any thresholds set for criteria known in the art. For example, one threshold may be set such that a feature set is updated if the data a listener receives from the stream of data 302 falls outside of the standard deviation of what would be expected for its feature type; this may trigger the listener to recompute the feature information.

Listeners may compute feature information, identify features that need to be recomputed, recompute any necessary feature information, and update the features 330. Features 330 may include multiple feature sets such as feature set X 332, feature set Y 334, and feature set Z 336. Features 330 may be submitted to one or more analytical models 350. Features 330 may be submitted to analytical models 350 for various reasons such as, for example, training, retraining, analysis, and the like. Some embodiments of the present disclosure include selecting a subset of features mapped to attributes based on predetermined criteria (e.g., selected prior to mapping features to attributes).

Listeners maintain the features 330. By maintaining updated features 330, the listeners assist in keeping the analytical models 350 up to date. Listeners are not connected directly to the analytical models 350, and updating features 330 need not mandate submission to the analytical models 350. Listeners may keep features 330 up to date such that analytical models 350 may read up to date features 330 at any time. For example, analytical models 350 may initiate submission of the features 330 by submitting a request for the features 330 or by pulling the features 330.

In some embodiments of the present disclosure, the feature calculation loop is an infinite feature calculation loop. A never-ending feature loop may be enabled. Continuously sending data to the feature generation engine and continuously processing that data is another aspect of the present disclosure.

Listeners may be employed to continuously track the stream of data 302 for changes in features 330 or in the feature types the listener is tasked with updating. Listeners may update the features 330 as necessary based on additional and/or new information. As aforementioned, the updated features 330 need not immediately update any related analytical models 350; the analytical models 350 may be set to automatically update (e.g., integrate any changes as they occur), update periodically (e.g., hourly or daily), update manually, or the like.

Some embodiments of the present disclosure include calculating a difference between the changed feature and an unchanged value of the changed feature. Some embodiments further include determining the difference exceeds a significance threshold. In some embodiments, the significance threshold is quantified using a level of granularity of the features.

Some embodiments of the present disclosure include streaming the new data to the system continuously. The feature calculation loop 300 could run continuously. As a result, the underlying data and the features can change continuously. As a result, the features may be calculated based on a snapshot of data available at the time of computation.

Listener may be used each for transaction data 310, party data 320, and other types of data (not shown). Depending on volume and scalability requirements, listeners may be horizontally scaled. Each listener may determine whether certain features need to be recomputed. If a feature needs to be recomputed, the relevant listener may identify which features need to be recomputed, recompute the features, and save them. The listeners may have no connection with the analytical models. Listeners may simply keep features updated. The models can read the features at any time.

In some embodiments, certain data may be held static (e.g., not subjected to updating). Some data will not change or will not change in such a way that will meaningfully alter the result of the analytical models 350. For example, the standard acceleration due to gravity is approximately 9.8 m/s$^2$ for objects on (or relatively close to) the surface of Earth; for computations requiring the standard acceleration due to gravity, this number could be held constant. Holding some data static may ease computational burden.

Implementation of the present disclosure offers benefits on non-functional characteristics. For example, as the data volume increases, streaming solution may be scaled horizontally to meet the requirements. Speed may also be achieved by keeping the raw data and features in memory. Additionally, incremental data may be used to determine which subset of features and inputs to recalculate the model and rerun the model on the dataset. The present disclosure may be utilized to continuously calculate the subset of data that is necessary to include as part of the input data while omitting the remaining data, resulting in an optimizing results while minimizing the required computational resources and the time necessary for processing.

Analyzing and updating features may be performed infinitely (e.g., in an infinite loop.) The present disclosure may be used to determine which subset of data to process. Listeners may track information to identify changes in data (which may result in changes in features) for a set amount of time (e.g., a month or a year), for a set number of iterations (e.g., 1,000 updates), or indefinitely (e.g., until directed to stop or infinitely). The present disclosure may calculate scores as score information becomes available from a continuously run a ML model. The present disclosure discusses what work to do and how to continuously perform the work as data is received. The present disclosure may be used to minimize the cost (e.g., resource and time) of recalculating data. The present disclosure may also enable the continuous scoring of data.

Figure 4:
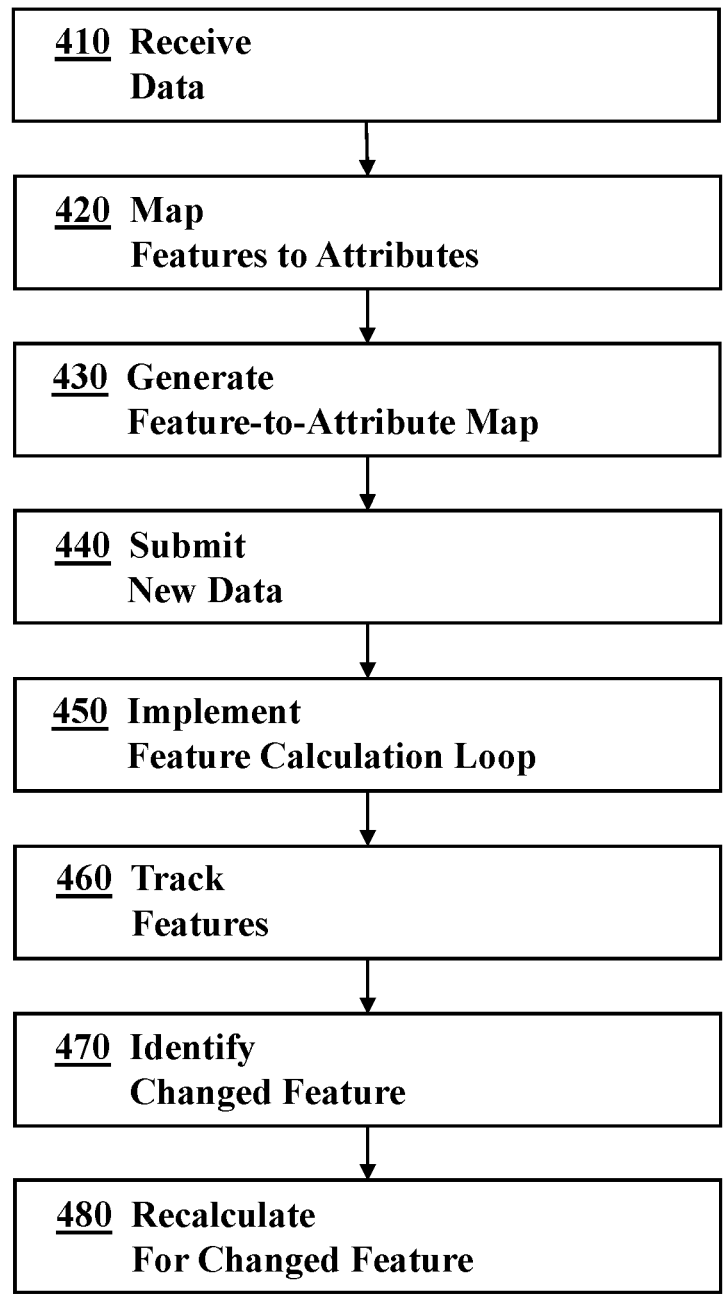
FIG. 4 depicts a method of feature generation optimization in accordance with some embodiments of the present disclosure.

FIG. 4 depicts a method 400 of feature generation optimization in accordance with some embodiments of the present disclosure. The method 400 includes receiving data 410, mapping features to attributes 420 of the data, and generating a feature-to-attribute map 430 based on the map resulting from the mapping features to attributes 420. The method 400 also includes submitting new data 440 to a feature calculation loop and implementing the feature calculation loop 450. The method 400 includes tracking features 460 in the feature calculation loop, identifying a changed feature 470, and recalculating for the changed feature 480 using the feature calculation loop.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
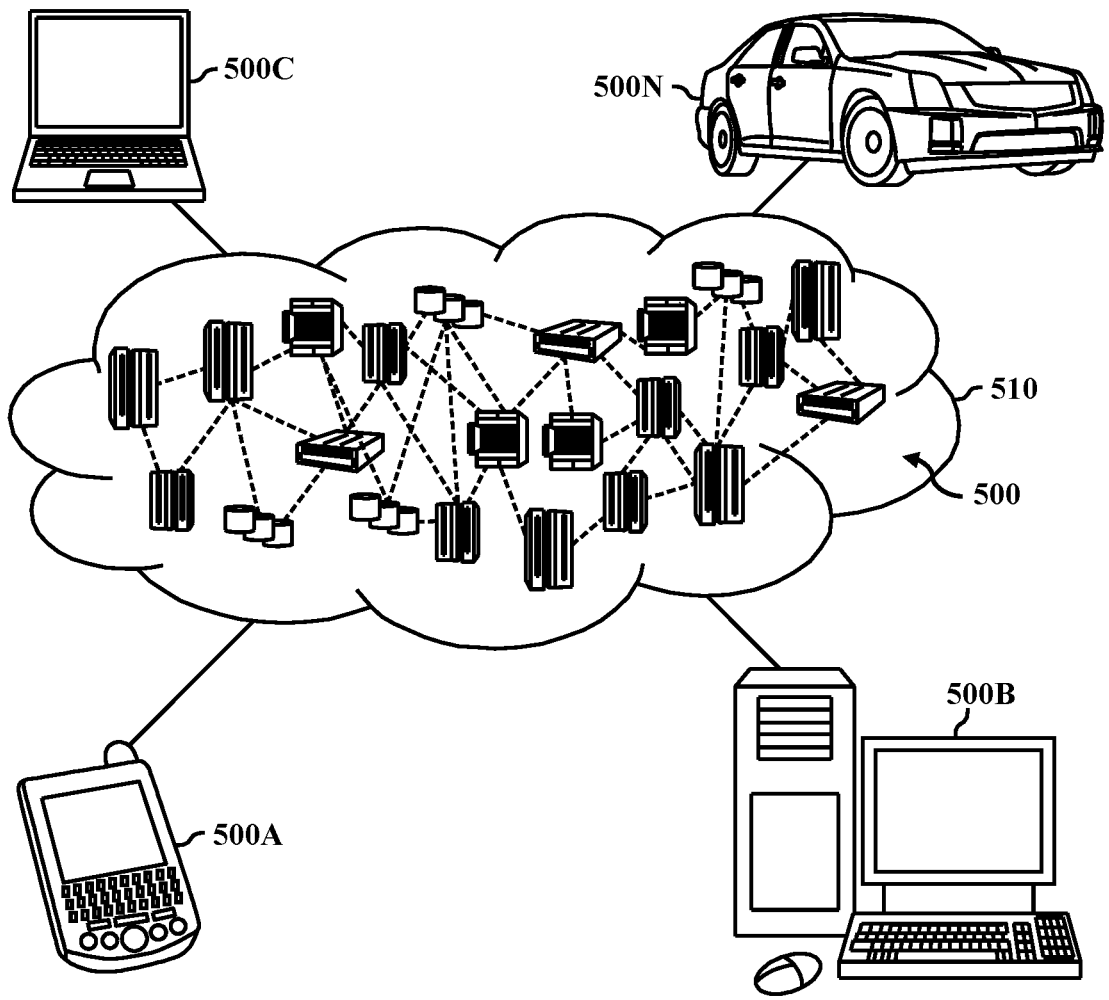
FIG. 5 illustrates a cloud computing environment, in accordance with embodiments of the present disclosure.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
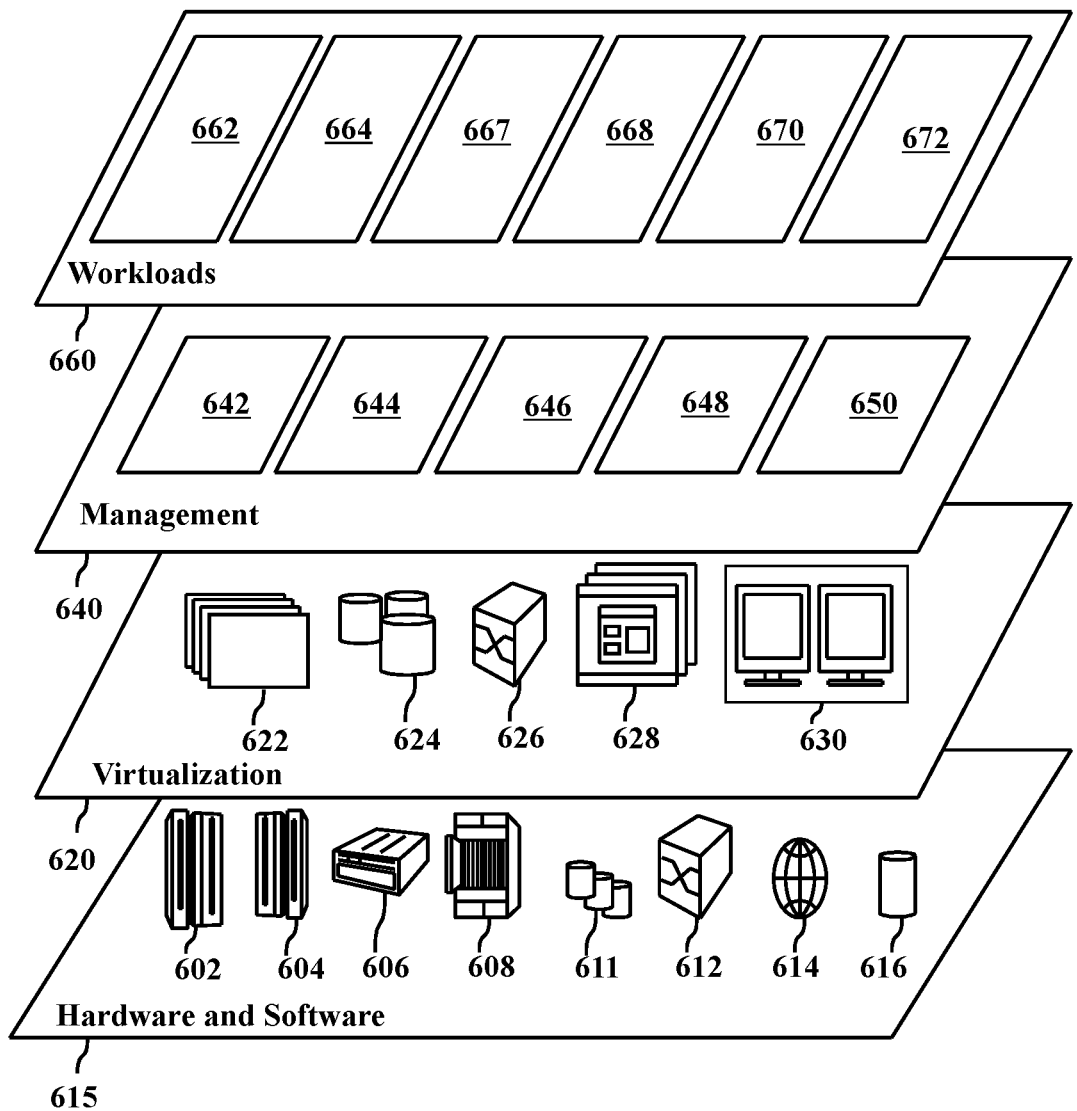
FIG. 6 depicts abstraction model layers, in accordance with embodiments of the present disclosure.

FIG. 6 illustrates abstraction model layers 600 provided by cloud computing environment 510 (FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 546 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and artificial content identification using subset scanning over generative model activations 672.

Figure 7:
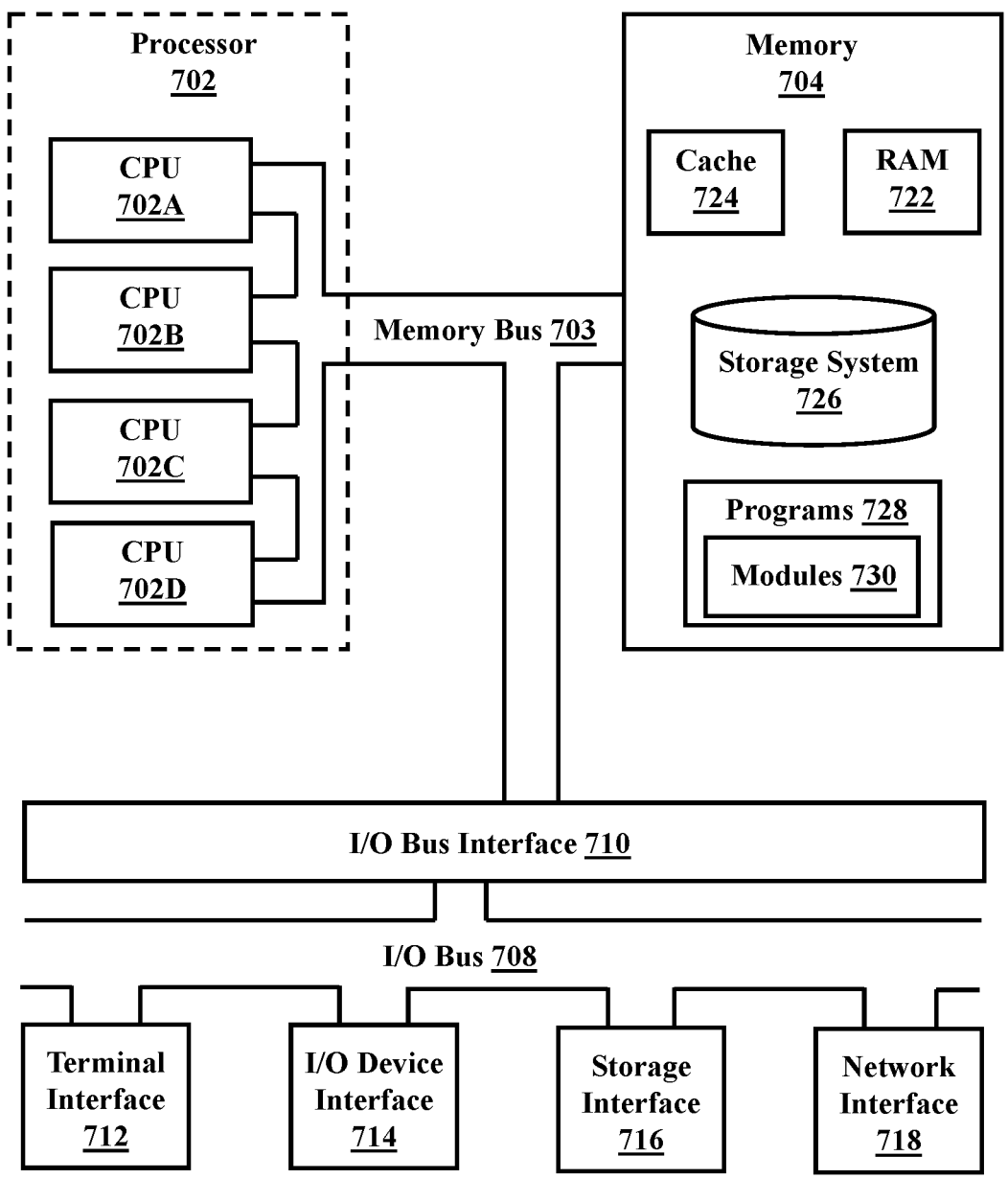
FIG. 7 illustrates a high-level block diagram of an example computer system that may be used in implementing one or more of the methods, tools, and modules, and any related functions, described herein, in accordance with embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system for computationally efficient analytical processing by restricting feature calculation to one or more changed features, said system comprising:
a memory; and
a processor in communication with said memory, said processor being configured to perform operations, said operations comprising:
receiving data;
mapping a plurality of features to a plurality of attributes of said data;
generating a feature-to-attribute map based on said mapping;
submitting new data to a feature calculation loop;
implementing said feature calculation loop;

tracking said features in said feature calculation loop;
identifying, in said features, one or more changed features;
determining a subset of said plurality of features to recalculate, wherein said subset of said plurality of features consists of said one or more changed features, wherein a difference between a first value of a changed feature of said plurality of features and a second value of said changed feature exceeds a significance threshold, wherein said significance threshold is quantified using a level of granularity of said features, wherein greater levels of said granularity, there is a greater amount of detail in said feature-to-attribute map; and
recalculating said subset of said plurality of features using said feature calculation loop, wherein said recalculation is restricted to said one or more changed features.

2. The system of claim 1, wherein:
said feature calculation loop is an infinite feature calculation loop.

3. The system of claim 1, further comprising:
streaming said new data to said system continuously.

4. The system of claim 1, further comprising:
maintaining said mapping, wherein maintaining said mapping enables differentiation of changed data and unchanged data.

5. The system of claim 1, further comprising:
calculating said difference between said second value and said first value.

6. The system of claim 5, further comprising:
determining said difference exceeds said significance threshold.

7. The system of claim 1, wherein:
said feature calculation loop maintains said feature-to-attribute map.

8. The system of claim 1, wherein:
said attribute is a data attribute.

9. A method for computationally efficient analytical processing by restricting feature calculation to one or more changed features, said method comprising:
receiving data;
mapping a plurality of features to a plurality of attributes of said data;
generating a feature-to-attribute map based on said mapping;
submitting new data to a feature calculation loop;
implementing said feature calculation loop;
tracking said features in said feature calculation loop;
identifying, in said features, one or more changed features;
determining a subset of said plurality of features to recalculate, wherein said subset of said plurality of features consists of said one or more changed features, wherein a difference between a first value of a changed feature of said plurality of features and a second value of said changed feature exceeds a significance threshold, wherein said significance threshold is quantified using a level of granularity of said features, wherein greater levels of said granularity, there is a greater amount of detail in said feature-to-attribute map; and
recalculating said subset of said plurality of features using said feature calculation loop, wherein said recalculation is restricted to said one or more changed features.

10. The method of claim 9, wherein:
said feature calculation loop is an infinite feature calculation loop.

11. The method of claim 9, further comprising:
streaming said new data continuously.

12. The method of claim 9, further comprising:
maintaining said mapping, wherein maintaining said mapping enables differentiation of changed data and unchanged data.

13. The method of claim 9, further comprising:
calculating said difference between said second value and said first value.

14. The method of claim 13, further comprising:
determining said difference exceeds said significance threshold.

15. The method of claim 9, wherein:
said feature calculation loop maintains said feature-to-attribute map.

16. The method of claim 10, wherein:
said attribute is a data attribute.

17. A computer program product for computationally efficient analytical processing by restricting feature calculation to one or more changed features, said computer program product comprising a computer readable storage medium having program instructions embodied therewith, said program instructions executable by a processor to cause said processor to perform a function, said function comprising:
receiving data;
mapping a plurality of features to a plurality of attributes of said data generating a feature-to-attribute map based on said mapping;
submitting new data to a feature calculation loop;
implementing said feature calculation loop;
tracking said features in said feature calculation loop;
identifying, in said features, one or more changed features;
determining a subset of said plurality of features to recalculate, wherein said subset of said plurality of features consists of said one or more changed features, wherein a difference between a first value of a changed feature of said plurality of features and a second value of said changed feature exceeds a significance threshold, wherein said significance threshold is quantified using a level of granularity of said features, wherein greater levels of said granularity, there is a greater amount of detail in said feature-to-attribute map; and
recalculating said subset of said plurality of features using said feature calculation loop, wherein said recalculation is restricted to said one or more changed features.

18. The computer program product of claim 17, wherein:
said feature calculation loop is an infinite feature calculation loop.

19. The computer program product of claim 17, further comprising:
maintaining said mapping, wherein maintaining said mapping enables differentiation of changed data and unchanged data.

20. The computer program product of claim 17, wherein:
said feature calculation loop maintains said feature-to-attribute map.

21. The computer program product of claim 17, further comprising:
calculating said difference between said second value and said first value.

22. The computer program product of claim 21, further comprising:
determining said difference exceeds said significance threshold.

* * * * *